United States Patent
Park

(10) Patent No.: US 7,350,867 B2
(45) Date of Patent: Apr. 1, 2008

(54) VEHICLE SEAT

(75) Inventor: Gil Sam Park, Ayase (JP)

(73) Assignee: Johnson Controls Automotive Systems Corporation, Ayase-Shi, Kanagawa-Ken (JP)

( * ) Notice: Subject to any disclaimer, the term of this patent is extended or adjusted under 35 U.S.C. 154(b) by 79 days.

(21) Appl. No.: 10/509,566

(22) PCT Filed: Mar. 26, 2003

(86) PCT No.: PCT/JP03/03726

§ 371 (c)(1),
(2), (4) Date: Sep. 8, 2005

(87) PCT Pub. No.: WO03/082624

PCT Pub. Date: Oct. 9, 2003

(65) Prior Publication Data

US 2006/0071527 A1   Apr. 6, 2006

(30) Foreign Application Priority Data

Mar. 29, 2002  (JP) .............................. 2002-094619

(51) Int. Cl.
*B60N 2/20* (2006.01)
(52) U.S. Cl. ................ 297/378.12; 297/331; 297/332; 297/341
(58) Field of Classification Search ........... 297/378.12, 297/331, 332, 341
See application file for complete search history.

(56) References Cited

U.S. PATENT DOCUMENTS

| 3,940,182 | A | * | 2/1976 | Tamura | ............. | 297/378.12 X |
| 4,015,877 | A | * | 4/1977 | Button | ........................ | 297/341 |
| 4,065,178 | A | * | 12/1977 | Carella et al. | ............... | 297/341 |
| 4,101,169 | A | * | 7/1978 | Muraishi et al. | ............. | 297/341 |
| 4,466,661 | A | * | 8/1984 | Narita | ............... | 297/378.12 X |
| 4,607,884 | A | * | 8/1986 | Heling | .............. | 297/378.12 X |
| 4,652,052 | A | * | 3/1987 | Hessler et al. | .............. | 297/341 |
| 4,707,030 | A | * | 11/1987 | Harding | ...................... | 297/341 |

(Continued)

FOREIGN PATENT DOCUMENTS

JP    59-163532    11/1984

(Continued)

OTHER PUBLICATIONS

International Search Report; International Application No. PCT/JP03/03726; mailed Jul. 22, 2003; 4 pgs.
Official Action issued Feb. 27, 2007 in counterpart Japanese application, 2 pages.

*Primary Examiner*—Rodney B. White
(74) *Attorney, Agent, or Firm*—Foley and Lardner LLP

(57) ABSTRACT

A seat for a vehicle is provided with a sliding device including a slide-lock mechanism, the sliding device sliding a seat body in a case of releasing the slide-lock mechanism, a seatback including a reclining device, the seatback being tilted forward in a case of releasing the reclining device, a seat cushion including a tip-up device, the seat cushion being tipped up in a case of operating the tip-up device and a walk-in mechanism including a lever, the walk-in mechanism configured to release the slide-lock mechanism, release the reclining device and operate the tip-up device in proportion to a shifting length of the lever. The tip-up device is operated in a case where the lever is shifted in an intermediate position and the slide-lock mechanism and the reclining device are released in a case where the lever is shifted in an end position.

8 Claims, 5 Drawing Sheets

U.S. PATENT DOCUMENTS

| | | | |
|---|---|---|---|
| 4,717,204 A * | 1/1988 | Tezuka | 297/378.12 X |
| 4,781,354 A * | 11/1988 | Nihei et al. | 297/378.12 X |
| 4,822,101 A * | 4/1989 | Hosoe | 297/378.12 |
| 4,844,542 A * | 7/1989 | Humer | 297/378.12 X |
| 4,852,846 A * | 8/1989 | Weier | 297/341 X |
| 4,881,774 A * | 11/1989 | Bradley et al. | 297/378.12 X |
| 5,020,853 A * | 6/1991 | Babbs | 297/341 |
| 5,137,331 A * | 8/1992 | Colozza | 297/341 |
| 5,390,980 A * | 2/1995 | Premji et al. | 297/378.12 |
| 5,597,206 A * | 1/1997 | Ainsworth et al. | 297/378.12 |
| 5,626,392 A | 5/1997 | Bauer et al. | |
| 5,820,216 A * | 10/1998 | Feuillet | 297/341 |
| 5,899,532 A * | 5/1999 | Paisley et al. | 297/341 |
| 5,927,809 A * | 7/1999 | Tame | 297/378.12 X |
| 5,944,383 A * | 8/1999 | Mathey et al. | 297/341 |
| 6,443,414 B1 * | 9/2002 | Horsfield et al. | 297/341 X |
| 6,513,868 B1 * | 2/2003 | Tame | 297/341 |
| 6,619,741 B1 * | 9/2003 | Tame | 297/341 |
| 6,767,063 B1 * | 7/2004 | Abdella et al. | 297/378.12 |
| 6,799,801 B2 * | 10/2004 | Niimi et al. | 297/378.12 |
| 6,857,702 B2 * | 2/2005 | Becker et al. | 297/341 |
| 7,086,698 B2 * | 8/2006 | Shiraki | 297/378.12 X |
| 7,090,188 B2 * | 8/2006 | Severini et al. | 297/341 X |

FOREIGN PATENT DOCUMENTS

| | | |
|---|---|---|
| JP | 61-205524 | 9/1986 |
| JP | 63-161040 | 10/1988 |
| JP | 07-13241 U | 3/1995 |
| JP | 09-188172 | 7/1997 |
| JP | 09-188172 A | 7/1997 |
| JP | 00-094996 | 4/2000 |

* cited by examiner

VEHICLE SEAT

CROSS-REFERENCE TO RELATED PATENT APPLICATIONS

The present Application claims the benefit of priority to the following international Applications: PCT Patent Application No. PCT/JP2003/003726 titled "Seat for Vehicle" filed on Mar. 26, 2003 which published under PCT Article 21(2) on Oct. 9, 2003 as WO 03/082624 A1 in the Japanese language and Japanese Patent Application No. 2002-94619 filed on Mar. 29, 2002 (which are hereby incorporated herein by reference in their entirety).

FIELD

The present invention relates to a seat for a vehicle such as an automobile, a ship, an airplane or a railroad coach, and, more specifically, to a seat for a vehicle making it easy for an occupant to move within the vehicle.

BACKGROUND

A vehicle, such as an automobile, is generally provided with relatively large seats in comparison to the spatial dimensions of the interior thereof so as to provide laid-back seating for occupants. Therefore it is often uneasy for the occupants to move within the vehicle.

Japanese Patent Application Laid-open No. 61-205524, Japanese Utility Model Laid-open No. 63-191942 and 62-84536 disclose arts related to a vehicle seat provided with a foldable seatback and a slidable seat cushion, what is called "a walk-in mechanism". These arts make a seat capable of folding the seatback and sliding movement of the whole of the seat.

However, a conventional vehicle seat provided with the disclosed walk-in mechanism slides the seat while holding the seat cushion in a substantially horizontal position thereby limiting the sliding distance of the seat in fore-aft direction. Therefore the conventional vehicle seat even equipped with the walk-in mechanism cannot make it sufficiently easy for occupants to move within the vehicle.

SUMMARY OF THE INVENTION

The present invention is done in view of the above problem and is intended for providing a seat for a vehicle, which is capable of tilting a seatback forward as well as tipping a seat cushion up and hence enables longer sliding of the seat so as to ensure a space for making it easy for occupants to move within the vehicle, with an easy-operability of such operations.

According to one embodiment of the present invention, a seat for a vehicle includes a sliding device having a slide-lock mechanism. The sliding device is configured to move (e.g., slide) a seat body upon releasing the slide-lock mechanism, a seatback including a reclining device, the seatback being tilted forward in a case of releasing the reclining device, a seat cushion including a tip-up device, the seat cushion being tipped up in a case of operating the tip-up device and a walk-in mechanism including a lever, the walk-in mechanism configured to release the slide-lock mechanism, release the reclining device and operate the tip-up device in proportion to a shifting length of the lever.

The tip-up device is operated in a case where the lever is shifted in an intermediate position and the slide-lock mechanism and the reclining device are released in a case where the lever is shifted in an end position.

A shift of the lever alone enables tipping-up the seat cushion, reclining the seatback and sliding the seat. The seat for a vehicle according to the present invention can be slid in a larger distance than the seats according to the prior arts because the seat cushion moves accompanying with tipping-up thereof. Such a movement as well as reclining the seatback make it easy for an occupant to move within the vehicle.

DETAILED DESCRIPTION

A seat for a vehicle, in which a shift of a lever alone enables tipping-up of a seat cushion, reclining of a seatback, and sliding the seat is provided. The seat can be slid in a relatively greater and larger distance because the seat cushion moves accompanying with tipping-up thereof. Such a movement, as well as reclining the seatback, improves the ability of an occupant to move within the vehicle.

A seat apparatus 1 according to an embodiment of the present invention will be described hereinafter with reference to FIGS. 1 through 5. With reference to FIGS. 1 through 4, FR denotes "forward", RR denotes "rearward", UP denotes "upward" and LWR denotes "downward". These directions are defined for convenience of an explanation and any embodiments opposed to such a definition are intended to be within the scope of the present invention.

Figure 1:
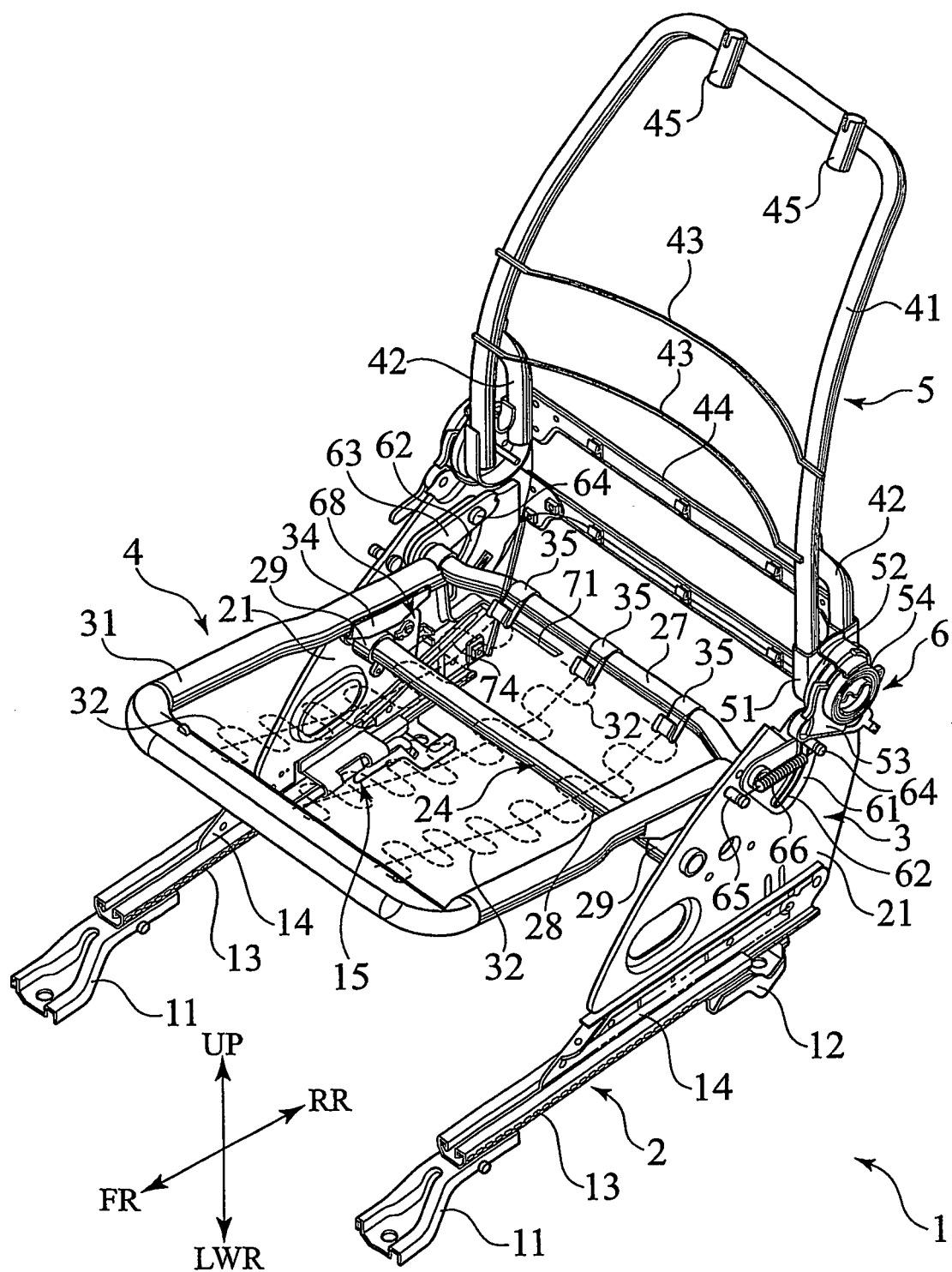
FIG. 1 is a perspective view of a seat apparatus according to an embodiment of the present invention.
Figure 2:
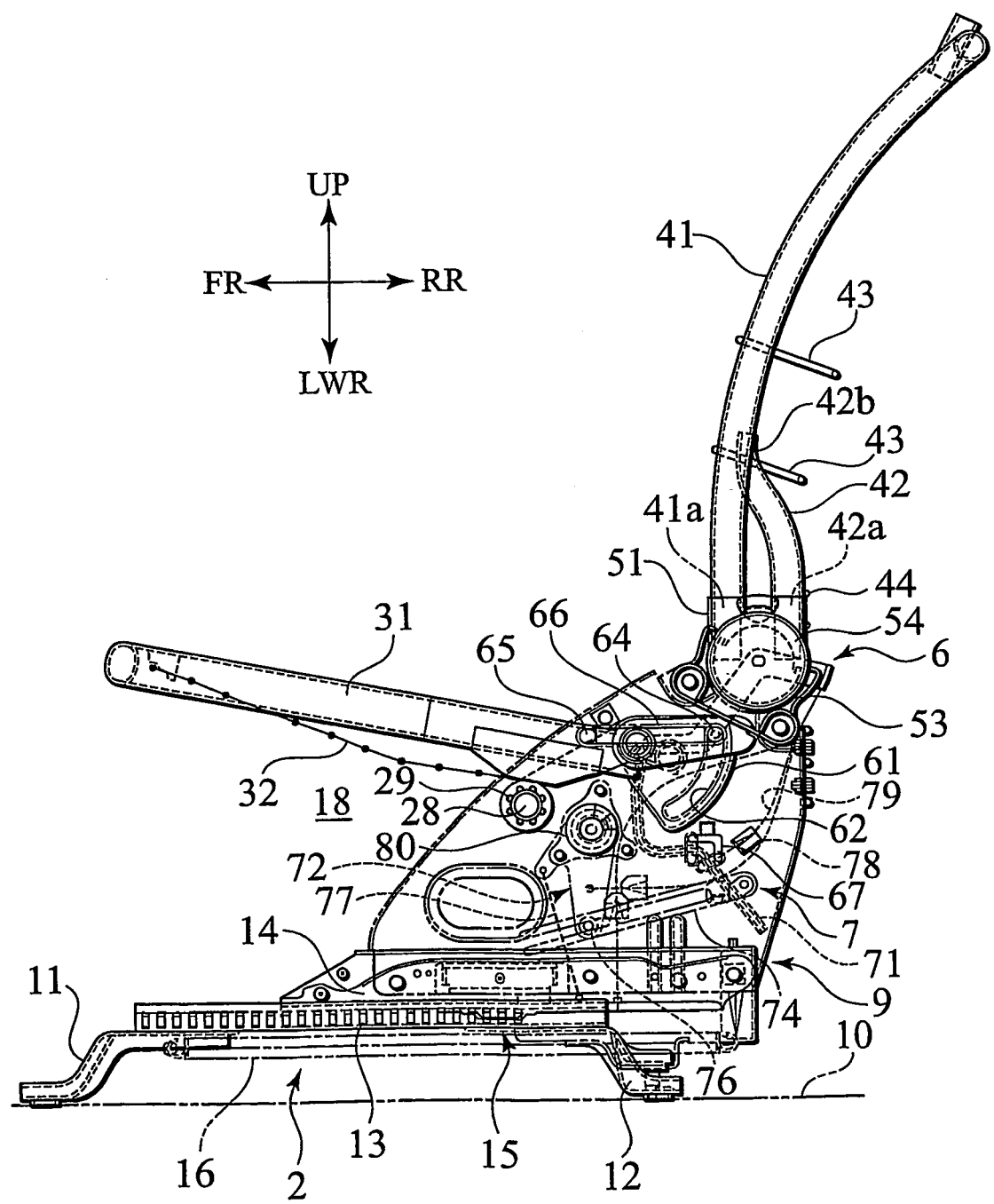
FIG. 2 is a side view of the seat apparatus according to the embodiment of the present invention.

The seat apparatus 1 comprises a basic framework of a seat for a vehicle and, as shown in FIGS. 1 and 2, is generally provided with a pair of slide devices 2, a pair of support frames 3, a seat cushion portion 4, a seatback portion 5, a reclining device 6, a tip-up device 7, a lifter device 8 and a walk-in mechanism 9. The seat apparatus 1 may include additional features such as a headrest, a seat belt and a seat cover to provide a seat for a vehicle, however, such features are not shown in the Figures. The slide devices 2 are configured to be coupled to a body of the vehicle (not shown).

The slide devices 2 are provided with fixed rails 13 each having a slit on an upper side thereof, sliding rails 14, each of which is formed to have an inverted T-letter shape and configured to slidably fitted into (e.g., engage) the slit, a slide-lock mechanism 15 for securing the sliding rails 14 in a desired position, and coil springs 16 which are respectively stretched between the fixed rails 13 and the sliding rails 14 so as to give force to (e.g., bias) the sliding rails 14 in a forward direction. Furthermore, though not shown in the Figures, rollers and/or ball bearings for facilitating the relatively smooth sliding of the sliding rails 14 on the fixed rails 13 are further provided. The slide devices 2 are provided at both sides of the seat in a symmetrical manner and coupled to a floor 10 (see FIG. 2) of a vehicle body by first brackets 11 provided at a front thereof of the slide devices 2 and second brackets 12 provided at a rear thereof of the slide devices 2.

The support frames 3 are comprised of a pair of frame bodies 21 made of steel sheets formed in a substantially right triangular shape and respectively provided with oval openings 22. The paired frame bodies 21 are respectively fixed on the pair of fixed rails 14 in a manner that a base of the right triangle is directed downward, a side orthogonal to the base is vertically directed and a remaining hypotenuse is directed forward. The oval openings 22 are formed in an oval shape directed obliquely upward and forward so as to allow movement of a third shaft portion 27 described later.

Figure 3:
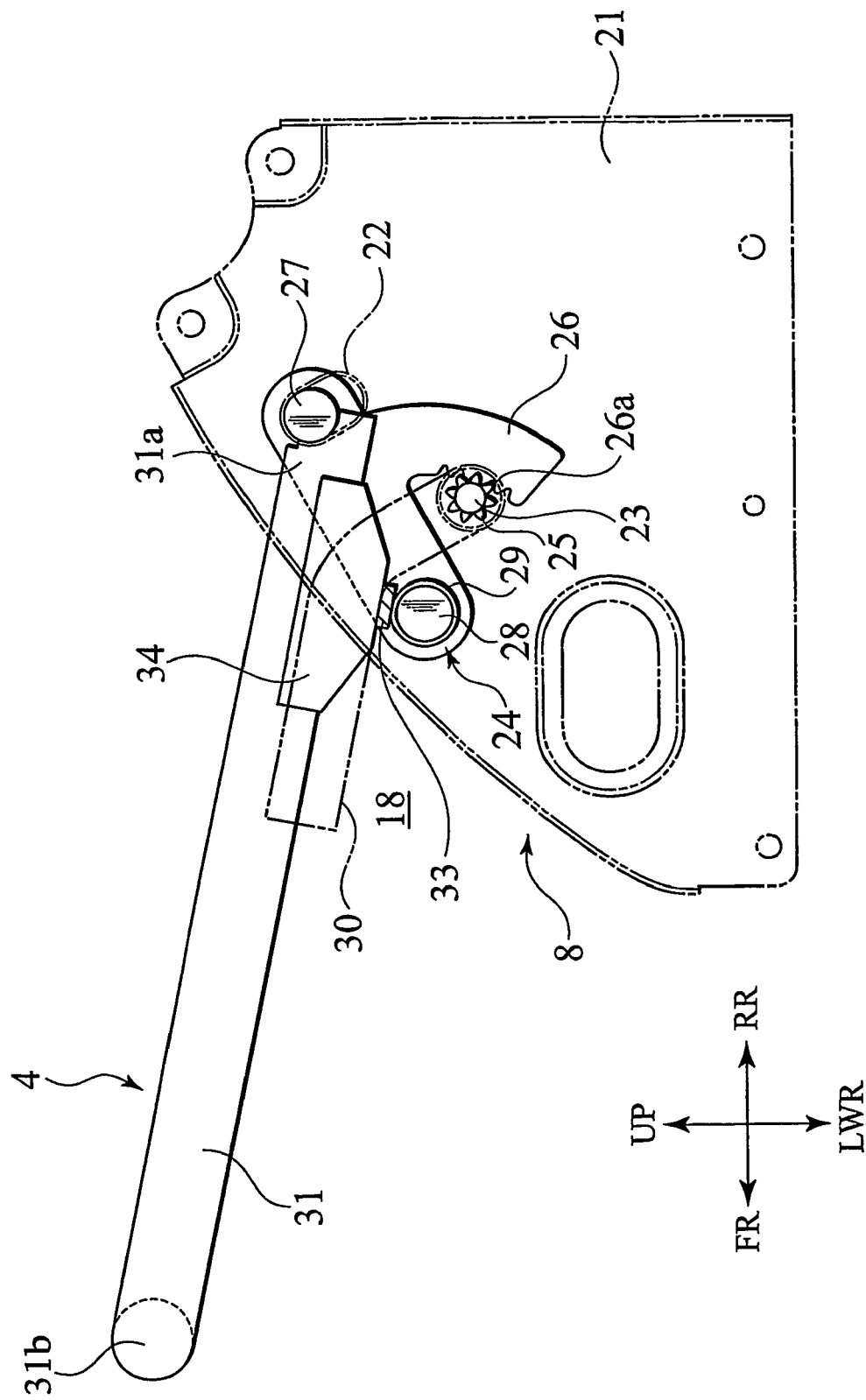
FIG. 3 is a side view of a lifter device of the seat apparatus according to the embodiment of the present invention.

As shown in FIG. 3, the lifter device 8 is provided with a first shaft portion 23, a second shaft portion 24, which are projectingly provided on inner sides of the paired frame bodies 21, a gear 25 pivotally supported by the first shaft portion 23 and a sector gear 26 pivotally supported by the second shaft portion 24. The sector gear 26 has gear teeth 26a formed on the front side thereof, which engage with the gear 25 pivotally supported in front of the sector gear 26. The oval openings 22 are formed so that the major axes thereof substantially correspond with an arc around the first shaft portion 24. The gear 25 is capable of rotating by means of operation means 30. When lifting the operation means 30 upward, rotation of the gear 25 lets the sector gear 26 swing downward and a front end portion 31b of a cushion frame 31 swing upward. When reversely operating the operation means 30, the front end portion 31b swings downward.

As shown in FIG. 1, the seat cushion portion 4 is provided with a closed-loop-like cushion frame 31, a plurality of brackets 35 formed on the cushion frame 31 and a plurality of S-shape springs 32 respectively stretched in a fore-aft direction via the plurality of brackets 35. The seat cushion portion 4 is covered with a pad and a cover (not shown) to provide a seat cushion. A rear end portion 31a of the cushion frame 31 is coupled to the third shaft portion 27. The cushion frame 31 is further provided with brackets 34 and absorbers 33 made of any suitable material having viscoelasticity such as rubber. The absorbers 33 are laid on a peripheral surface of an upper side of the second shaft portion 24 between the second shaft portion 24 and the brackets 34. The absorbers 33 reduce noise which may be generated when the cushion frame 31 hits the second shaft portion 24.

The second shaft portion 24 of the sector gear 26 is provided with a fixed shaft 28 coupled to the frame bodies 21 and rotation shafts 29 rotatably and pivotally supported by the fixed shaft 28. The fixed shaft 28 and the rotation shafts 29 are lubricated with a proper lubricant such as grease. The fixed shaft 28 is provided with retaining means, such as conically expanded both ends thereof, so as to prevent the rotation shafts 29 from displacement.

The seatback portion 5 is provided with a seatback frame 41, sub-frames 42, upper end portions 42b of which are welded and fixed with rear sides of lower end portions 41a of the seatback frame 41, and a plurality of wires 43 laid between both sides of the seatback frame 41. The seatback portion 5 is covered with a pad and a cover, which are not shown in the drawings, so as to form a seatback. The lower end portion 41a of the seatback frame 41 and lower end portion 42a of the sub-frame 42 are separated to provide a space in a fore-aft direction. According to one embodiment, the reclining device 6 is provided within the space defined by lower end portions 41a and 42a. The seatback portion 5 is provided with a plurality of holders 45 on an upper end thereof so as to support a headrest (not shown).

The reclining device 6 is provided with covers 51 for respectively covering the lower end portions 41a and the lower end portions 42a of the sub-frames 42, support members 52, base plates 53 supported on the upper end of the frame bodies 21, springs 54 for constantly pressing (e.g., biasing) the seatback portion 5 forward and a device lever 55 for releasing a lock of the reclining device 6. When releasing the lock of the reclining device 6, the seatback portion 5 tilts forward by the pressing force of the springs 54. The lower end portions 41a of the seatback frame 41 are welded with front end portions of the covers 51 and the lower end portions 42a of the sub-frames 42 are welded with rear end portions of the covers 51, thereby the seatback frame 41 is coupled to the covers 51.

Figure 4:
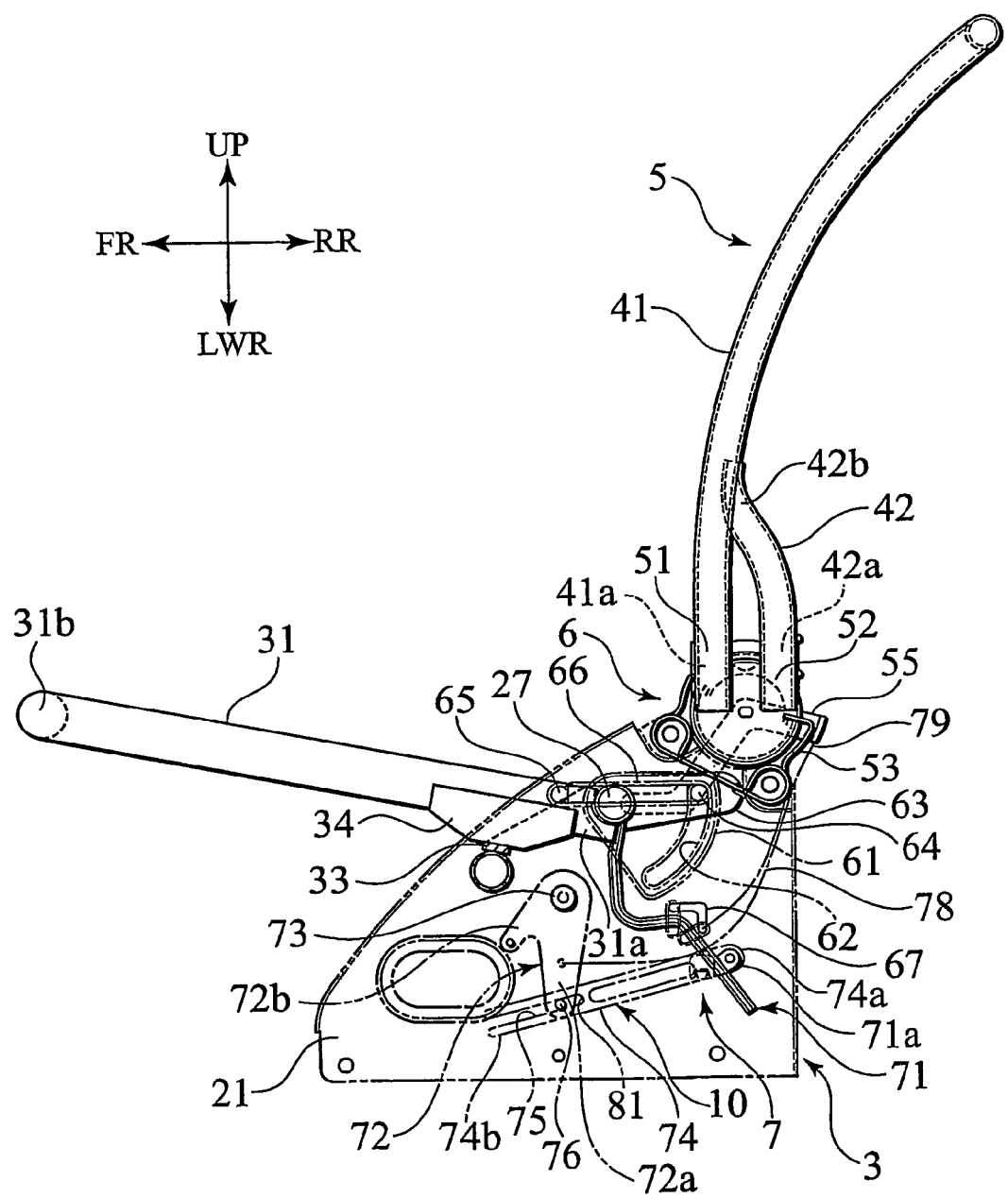
FIG. 4 is a side view of the seat apparatus according to the embodiment of the present invention, specifically showing a tip-up device and a walk-in mechanism.
Figure 5:
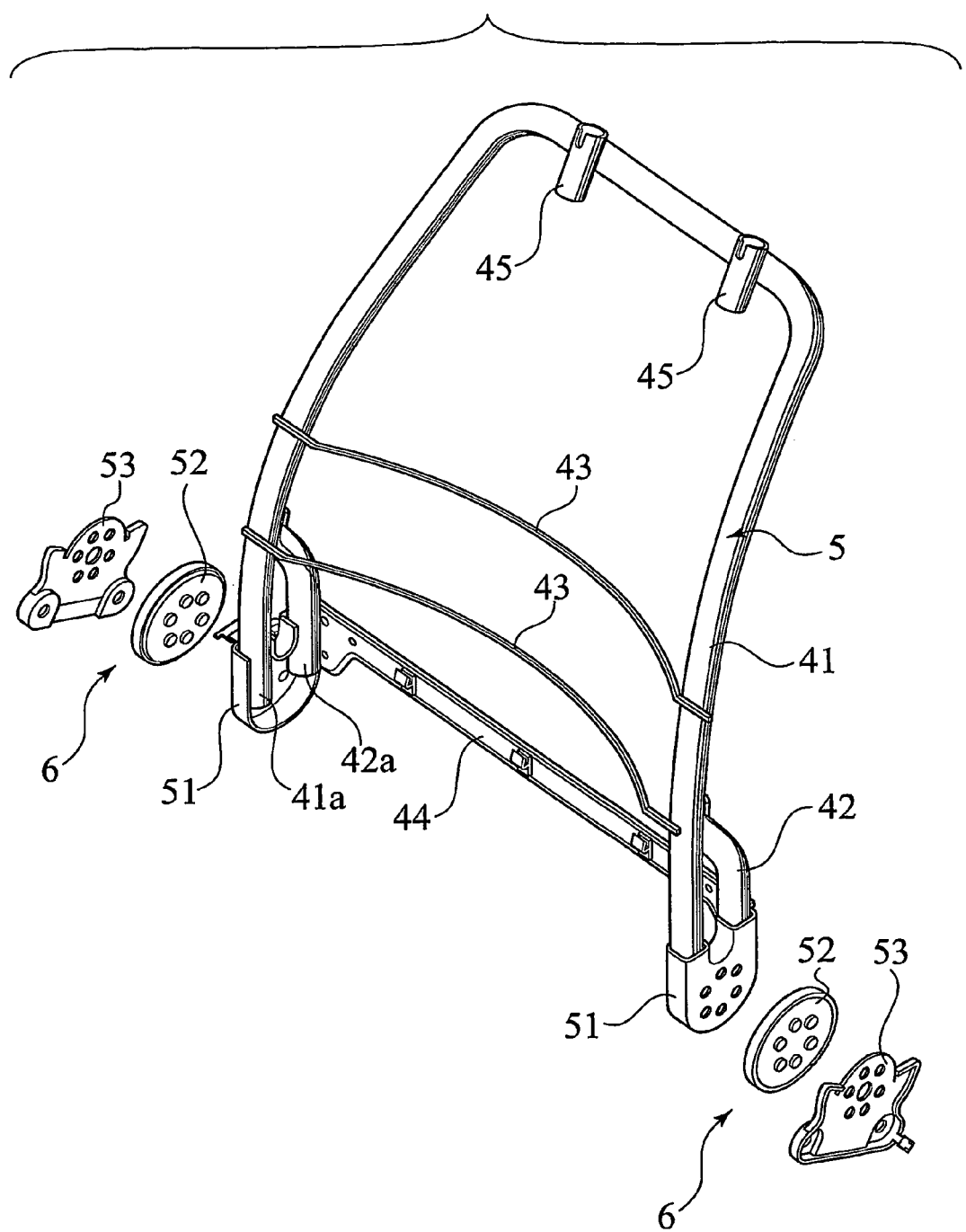
FIG. 5 is a perspective view of a reclining device of the seat apparatus according to the embodiment of the present invention.

As shown in FIG. 4, the tip-up device 7 is provided with restriction portions 61, arms 63 extending reward from the third shaft portion 27 and fifth shaft portions 65 projectingly provided in front of the third shaft portion 27. The tip-up device 7 is fitted into the third shaft portion 27 so as to be exterior to the frame bodies 21. The restriction portion 61 is further provided with a through-hole 62 formed in a shape like an arc, which has a center on the third shaft portion 27. Each arm 63 is further provided with a fourth shaft portion 64 projectingly provided on an outer surface thereof and the fourth shaft portion 64 is movably fitted in the through-hole 62. Between the fourth shaft portions 64 and the fifth shaft portions 65, coil springs 66 are respectively laid and stretched. The fourth shaft portions 64 rotate around the third shaft portion 27 and the springs 66 are laid at the fifth shaft portions 65 disposed ahead of the third shaft portion 27, thereby the springs 66 bias the fourth shaft portions 64 toward an upper end or a lower end of the through-hole 62. Therefore the vicinity of the center of the through-hole 62 is a dead point where the force by the springs 66 is lost and unstable.

As shown in FIGS. 2 and 4, the walk-in mechanism 9 is provided with a pedal lever 71, a slide-release link 74 cooperatively working with the pedal lever 71 and a slide-release plate 72. The pedal lever 71 extends from the third shaft portion 27 of the cushion frame 31 to a lower side of the seat apparatus 1 and has a pivot pin 71a at a middle thereof. The slide-release link 74 is formed in a substantially linear shape, a front end thereof is a fork end 74b having a cut 75 and a rear end 74a is rotatably and pivotaly supported by the pivot pin 71a. The slide-release plate 72 is a flat plate having a first wing 72a and a second wing 72b and being formed in a boomerang-like shape. The slide-release plate 72 is rotatably and pivotally supported by the frame bodies 21 with a sixth shaft portion 73. A pin 76 is projectingly formed on a tip end of the first wing 72a and slidably fitted to the cut 75. A proper clearance exists between a rear end 81 of the cut 75 and the pin 76. Slide-lock-release wires 78 and 77 are respectively connected to the first wing 72a and the second wing 72b. A reclining-release wire 79 linking with the reclining device 6 is connected to a middle of the pedal lever 71. A spring 80 constantly biases the slide-release plate 72 rearward.

The walk-in mechanism 9 regulates operation of the slide-lock device 15, the reclining device 6 and the tip-up device 7 in proportion to a shifting length of the pedal lever 71. When shifting the pedal lever 71 down, the cushion frame 31 swings upward around the third shaft portion 27. When further shifting the pedal lever 71 down in an intermediate position thereof, the fourth shaft portions 64 swing upward over the dead point and is hence given downward force by the springs 66, thereby the cushion frame 31 leaps up (tips up). Simultaneously, the rear end 74b of the slide-release link 74 is pressed downward and forward by the pedal lever 71, however, the pin 76 keeps still because the proper clearance exists between the rear end 81 and the pin 76. Meanwhile, when pressing the cushion frame 31 downward so that the fourth shaft portions 64 go over the dead point, the cushion frame 31 easily returns to its original position by means of the force by the springs 66.

When shifting the pedal lever 71 down in an end position thereof, the rear end 81 abuts and presses the pin 76 forward. Thereby the slide-release plate 72 swings around the sixth shaft portion 73 and the slide-release wires 77 and 78 are pulled so that the slide-lock mechanism 15 is released. Provided that the slide-lock mechanism 15 is released, the sliding rails 14 move forward by means of the force by the spring 16. Simultaneously, the reclining-release wire 79 is pulled downward so that the reclining device 6 is released, thereby the seatback portion 5 can be tilted forward.

Namely, when shifting the pedal lever 71 downward to a considerable extent, tipping-up of the seat cushion portion 4, tilting of the seatback portion 5 and moving forward of the sliding rails 14 are simultaneously achieved. Moreover, the tipping-up of the seat cushion portion 4 makes it possible to slide whole of the seat forward in a large distance.

Although the invention has been described above by reference to certain embodiments of the invention, the invention is not limited to the embodiments described above. Modifications and variations of the embodiments described above will occur to those skilled in the art, in light of the above teachings.

The invention claimed is:

1. A seat for a vehicle comprising:
   a sliding device including a slide-lock mechanism, the sliding device configured to slide a seat body upon releasing the slide-lock mechanism;
   a seatback including a reclining device, the seatback configured to be tilted forward upon releasing the reclining device;
   a seat cushion including a tip-up device, the seat cushion configured to be tipped up upon operating the tip-up device; and
   a walk-in mechanism including a lever, the walk-in mechanism configured to release the slide-lock mechanism, release the reclining device, and operate the tip-up device relative to a position of the lever.

2. The seat of claim 1, wherein the walk-in mechanism is configured to operate the tip-up device upon moving the lever to an intermediate position, and to release the slide-lock mechanism and the reclining device upon moving the lever to an end position.

3. The seat of claim 1, wherein the walk-in mechanism comprises:
   a slide-release link pivotally supported by the lever; and
   a slide-release plate including a slide-release wire connected to the slide-lock mechanism, a reclining-release wire connected to the reclining device and a pin leaving a clearance to the slide-release link,
   the lever being connected to the tip-up device to operate the tip-up device upon moving the lever to an intermediate position,
   the lever being configured to clear the clearance so that the pin presses the slide-release link whereby the slide-release plate swings and the slide-release wire and the reclining-release wire are pulled so as to release the slide-lock mechanism and the reclining device upon moving the lever to an end position.

4. A seat for a vehicle comprising:
   a sliding device including a slide-lock mechanism, the sliding device configured to slide a seat body upon releasing the slide-lock mechanism;
   a seatback including a reclining device, the seatback configured to be tilted forward upon releasing the reclining device;
   a seat cushion including a tip-up device, the seat cushion configured to be tipped up upon operating the tip-up device; and
   a walk-in mechanism including a lever, the walk-in mechanism configured to release the slide-lock mechanism, release the reclining device, and operate the tip-up device relative to a position of the lever, wherein the walk-in mechanism is configured to operate the tip-up device upon moving the lever to an intermediate position, and to release the slide-lock mechanism and the reclining device upon moving the lever to an end position.

5. The seat of claim 4, wherein the walk-in mechanism comprises:
   a slide-release link pivotally supported by the lever; and
   a slide-release plate including a slide-release wire connected to the slide-lock mechanism, a reclining-release wire connected to the reclining device and a pin leaving a clearance to the slide-release link,
   the lever being connected to the tip-up device to operate the tip-up device upon moving the lever to an intermediate position,
   the lever being configured to clear the clearance so that the pin presses the slide-release link whereby the slide-release plate swings and the slide-release wire and the reclining-release wire are pulled so as to release the slide-lock mechanism and the reclining device upon moving the lever to an end position.

6. A vehicle seat, comprising:
   a sliding device for sliding the vehicle seat, the sliding device including a slide-lock mechanism;
   a seat cushion supported above the sliding device and including a tip-up device, the seat cushion configured to be tipped up upon operating the tip-up device;
   a seatback supported with respect to the seat cushion and including a reclining device, the seatback tilting forward upon release of the reclining device; and
   a walk-in mechanism including a lever, the walk-in mechanism configured to release the slide-lock mechanism and to release the reclining device and operate the tip-up device depending on the position of the lever.

7. The vehicle seat of claim 6, wherein the walk-in mechanism is configured to operate the tip-up device in a case of shifting the lever to a first position, to release the slide-lock mechanism and the reclining device in a case of shifting the lever to an second position.

8. The vehicle seat of claim 6, wherein the walk-in mechanism comprises:
   a slide-release link pivotally supported by the lever; and
   a slide-release plate including a slide-release connection connected to the slide-lock mechanism, a reclining-release connection connected to the reclining device and a pin leaving a clearance to the slide-release link;

wherein the lever is connected to the tip-up device to operate the tip-up device when the lever is shifted to the first position;

wherein the lever is configured to clear the clearance so that the pin presses the slide-release connection whereby the slide-release plate moves and the slide-release connection and the reclining-release connection are moved to release both the slide-lock mechanism and the reclining device in a case of shifting the lever to the second position.

* * * * *